US006073335A

United States Patent [19]

Lampers

[11] Patent Number: 6,073,335

[45] Date of Patent: Jun. 13, 2000

[54] METHOD FOR PROVIDING A DOOR ORNAMENT SUPPORT

[76] Inventor: Nicholas J. Lampers, 2018 San Diego Dr., Corona, Calif. 91720

[21] Appl. No.: 09/169,257

[22] Filed: Oct. 9, 1998

[51] Int. Cl.[7] ........................ B23P 19/02

[52] U.S. Cl. ........................ 29/525.01; 248/301; 248/304; 359/504; 49/171

[58] Field of Search ........................ 359/504; 49/171; D8/367, 373; 29/525.01; 248/301, 304

[56] References Cited

U.S. PATENT DOCUMENTS

| | | | |
|---|---|---|---|
| D. 321,124 | 10/1991 | Gary | D8/373 |
| D. 342,889 | 1/1994 | Adams | D8/367 |
| D. 361,713 | 8/1995 | Grant | D8/373 |
| D. 365,015 | 12/1995 | Avinger | D8/373 |
| 2,028,108 | 1/1936 | Sklar | 20/39 |
| 2,124,525 | 7/1938 | Frankel | 49/171 |
| 4,116,529 | 9/1978 | Yamaguchi | 359/504 |
| 4,175,824 | 11/1979 | Daley | 359/504 |
| 4,269,474 | 5/1981 | Kamimura | 359/504 |

*Primary Examiner*—S. Thomas Hughes
*Assistant Examiner*—Anthony L. Green
*Attorney, Agent, or Firm*—John R. Benefiel

[57] ABSTRACT

A method of supporting an ornament on the exterior of a door uses a peep hole fixture to mount a hanger piece. The hanger piece is a flat metal strip having a hole in one end sized to be received on the peep hole fixture barrel while being captured by a flange on the fixture. A hook on a depending end of the strip provides an attachment feature for holding the ornament.

5 Claims, 1 Drawing Sheet

METHOD FOR PROVIDING A DOOR ORNAMENT SUPPORT

BACKGROUND OF THE INVENTION

This invention concerns the support of ornaments, and particularly large seasonal displays such as wreaths, on the door to an apartment or residence.

It has been difficult as a practical matter to support the weight of heavier ornaments on a door without the use of fasteners requiring one or more holes to be made in the door, obviously undesirable as entailing marring of the door surface.

Top of the door hooks have also been used, but these require a strip held in the door closing clearance with the door frame, and thus often do not fit properly to all doors or interfere with door closing. Such hangers are also quite conspicuous.

Steel doors and hollow core doors also present further particular difficulties in attaching fasteners to hold ornament supports.

It is the object of the present invention to provide a method of hanging a door ornament which does not require drilling holes or driving nails or screws into the door, and which securely and reliably provide an ornament support for any door.

SUMMARY OF THE INVENTION

The above recited object and others which will become apparent upon a reading of the following specification and claims are achieved by use of a flat hanger piece, having a hole formed in one end and a bent angle hook comprising an attachment feature formed on the other end.

A peep hole fixture is disassembled to allow the barrel to be inserted through the hole, and the peep hole fixture reinstalled in the door.

The flat hanger piece is captured beneath a flange on the outer end of the peep hole fitting, securely retaining the hanger piece depending from the peep hole barrel. The hook at the lower end of the hanger piece projects out from the door surface, allowing suspension of the door ornament therefrom.

DESCRIPTION OF THE DRAWING FIGURE

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
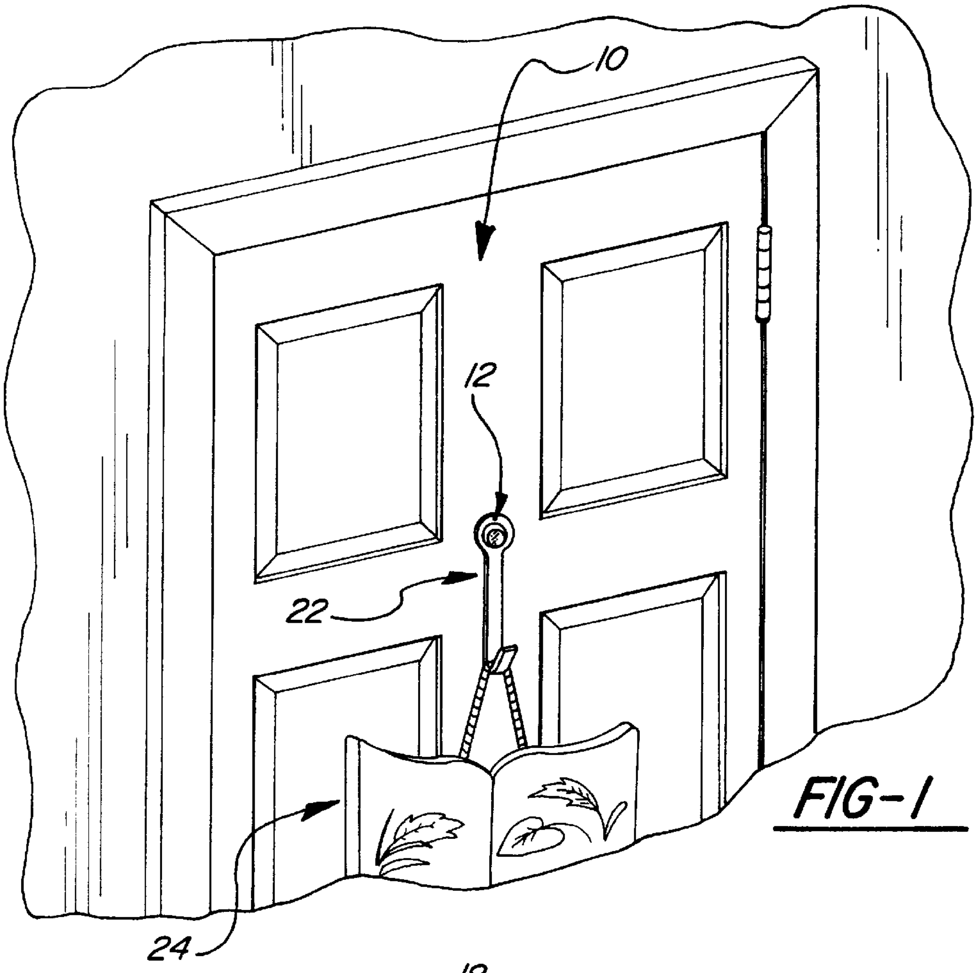
FIG. 1 is a perspective fragmentary view of a front door showing a hanger piece and suspended ornament installed on a peep hole fixture according to the method of the present invention.
Figure 2:
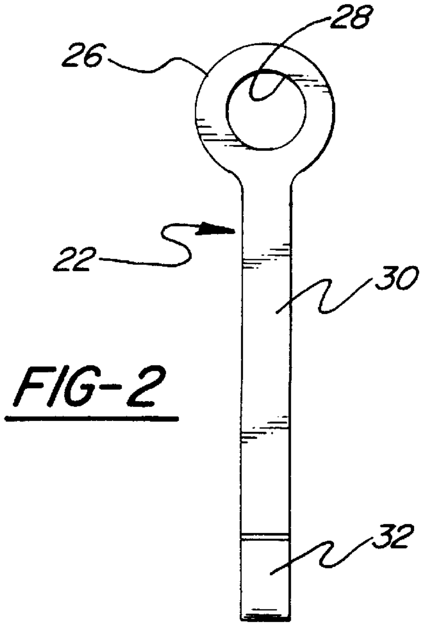
FIG. 2 is a front view of the hanger piece.
Figure 3:
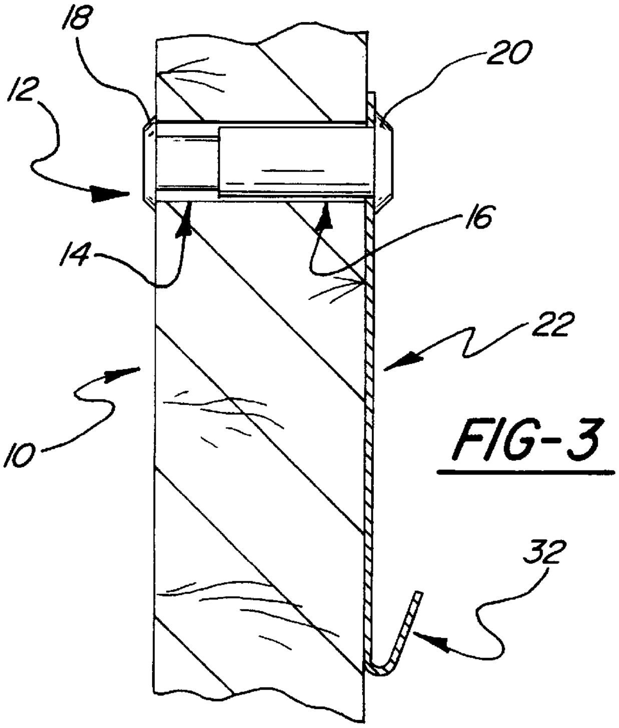
FIG. 3 is a fragmentary view of a door section and hanger piece depicting the installation of the hanger piece on a peep hole fitting.

Referring to the drawings, and particularly FIG. 1, the front door 10 of a residence, apartment, or hotel room or suite is shown. The door 10 is equipped with a peep hole fixture 12 of a conventional type, having a wide angle lens enabling a person on the inside of the door to view the area exterior to the door before opening the door, in the well known manner.

The peep hole fixture 12 is of two piece construction, comprised of an interior and an exterior flanged barrel piece 14, 16, which are threaded together. The interior piece 14 has a flange 18 formed with screw driver engagable features, while the external piece 16 has a smooth flange 20 not easily engagable with a tool. The two fixture pieces 14, 16 are normally threaded together until the flanges 18, 20 engage the inner and outer door surfaces, thus accommodating different door thicknesses.

According to the concept of the present invention, a flat strip hanger piece 22 is installed on the peep hole fixture 12 so as to allow a door ornament 24 to be hung on the door 10.

The hanger piece 22 is fabricated to include an enlarged annular eye portion 26 having a hole 28 sized to be slidable into the main diameter of the peep hole fixture external piece 16, but smaller than the flange 20, so as to be captured by the flange when the pieces 14, 16 are threaded together.

A depending flat strip portion 30 is formed with an angled end creating a hook 32, providing an attachment feature for hanging the ornament 24.

The hanger piece 22 is preferably fabricated from a one-piece strip of a non-rusting material of sufficient strength, preferably metal, such as brass, stainless steel, chrome steel, coated steel, aluminum, etc., of a sufficient size and thickness to be stiff enough to support the intended ornament weight.

Other materials such as a high strength molded plastic are possible, as is a two or more piece construction, with an attachment feature such as a separate riveted hook secured to the depending strip.

It can be appreciated that the method described allows a convenient non-marring door support, able to hold considerable weight, and does not involve complex or costly devices. The method can be applied to any door size.

The peep hole fitting can be installed at the same time, or the hanger piece can be installed to an existing peep hole fixture by removing and reinstalling the peep hole fixture.

What is claimed is:

1. A method of supporting an object on the exterior of a door equipped with a flanged peep hole fixture, comprising the steps of:

fabricating a hanger piece having flat sheet material portion formed with a hole at one end able to receive a barrel portion of said peep hole fixture while being captured by a flange portion thereof;

providing an attachment feature on said hanger piece;

installing said hanger piece on said peep hole fixture by passing said barrel portion through said hanger piece hole and driving said flange against said hanger piece flat sheet portion and an external surface of said door, whereby said object may be mounted to said attachment feature and supported by said hanger piece and said peep hole fixture.

2. The method according to claim 1 wherein said fabricating step, said hanger piece is formed of a single strip of flat metal.

3. The method according to claim 2 wherein a depending end of said hanger piece is angled up to form a hook comprising said attachment feature.

4. The method according to claim 3 wherein said hanger piece is fabricated of a non-corrosive metal.

5. The method according to claim 4 wherein said hole is formed in an annular eye portion of said hanger piece.

* * * * *